ANDRÉ MOTTU
ROBERT VIRET
BY Irwin S. Thompson
ATTY.

Dec. 12, 1961 A. MOTTU ET AL 3,012,452
REPEATER DEVICE OF THE STOP POSITIONS OF A MOBILE MEMBER OF
A PRECISION MACHINE-TOOL OR OF A MEASURING MACHINE
Filed Oct. 28, 1957 4 Sheets-Sheet 2
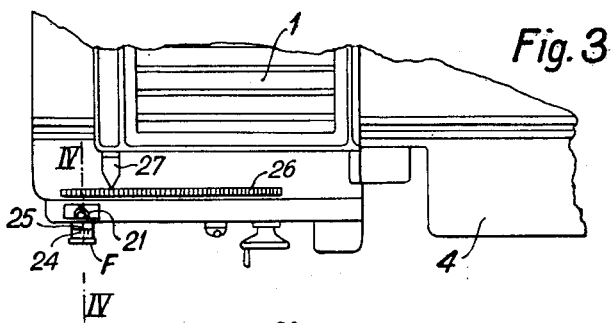
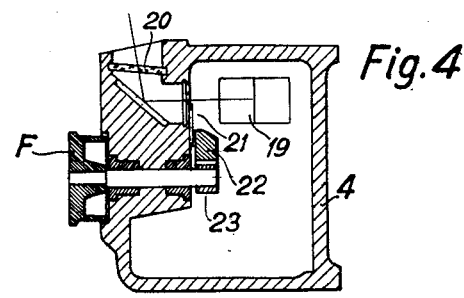
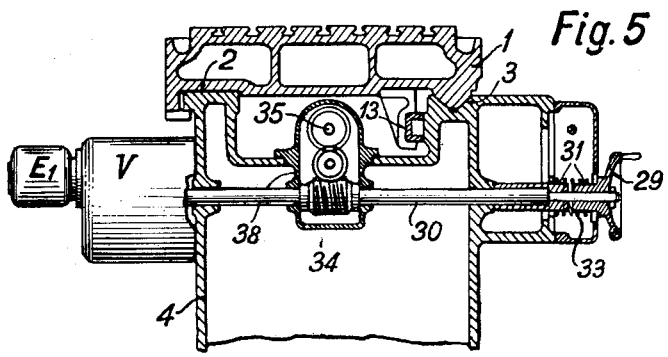
INVENTORS
ANDRE MOTTU
ROBERT VIRET
BY Irwin S. Thompson
ATTY.

ANDRE' MOTTU
ROBERT VIRET

Dec. 12, 1961 A. MOTTU ET AL 3,012,452
REPEATER DEVICE OF THE STOP POSITIONS OF A MOBILE MEMBER OF
A PRECISION MACHINE-TOOL OR OF A MEASURING MACHINE
Filed Oct. 28, 1957 4 Sheets-Sheet 4

INVENTORS
ANDRE MOTTU
ROBERT VIRET
BY Irwin S. Thompson
ATTY.

United States Patent Office 3,012,452
Patented Dec. 12, 1961

3,012,452
REPEATER DEVICE OF THE STOP POSITIONS OF A MOBILE MEMBER OF A PRECISION MACHINE-TOOL OR OF A MEASURING MACHINE
André Mottu and Robert Viret, Geneva, Switzerland, assignors to Societe Genevoise d'Instruments de Physique, Geneva, Switzerland, a corporation of Switzerland
Filed Oct. 28, 1957, Ser. No. 692,811
Claims priority, application Switzerland July 18, 1957
2 Claims. (Cl. 77—4)

The present invention has as an object to provide a repeater device of the stop positions of a mobile member of a precision machine tool or of a measuring machine.

The repeater devices of positions which are part of, for instance, the jig boring machines, boring machines, coordinate grinding machines, and other machine tools of this kind comprise generally stops or marks which have to be fastened manually on a carrier in defined positions in order to repeatedly and automatically stop the mobile member of the machine tool in desired positions. The exact setting into position of said stops or marks on their carrier is always a difficult and lengthy operation, and is frequently rendered very difficult to carry out correctly by reason of the lack of space and of the bad accessibility of said carrier. Consequently the setting into position of said stops or marks causes a significant idle time of the machine tool when it is desired to machine a small series of identical parts.

The device which is an object of the present invention tends to remedy these drawbacks and is characterized by the fact that it comprises at least one rotative magnetic memory member, at least one generator of electric impulses coupled, on the one hand, to said memory member and, on the other hand, to said mobile member in such a manner that the phase of the generated impulses is a function of the position of the mobile member, at least one magnetic head located opposite the surface of said memory member and connected by the intermediary of a commutator successively to the generator of impulses in order to register onto said memory device the emitted impulses which constitute then the remembrance of determined positions of the mobile member, and to a phase comparator, which is itself connected to said impulse generator device, said phase comparator delivering a voltage, the value of which is a function of the phase difference between the impulses which issue from the impulse generator and the impulses which are restituted by the memory device, and further a control apparatus responsive to the value of the voltage delivered by the phase comparator and which controls a driving device.

The attached drawing shows schematically and by way of example a jig boring machine equipped with a position repeater device according to the invention.

FIG. 3 is a partial plan view of the end of the apparatus presented in FIG. 1.

FIG. 4 is a magnified vertical cross section taken along line IV—IV of FIG. 3.

FIG. 5 is a vertical cross section along line V—V of FIG. 2.

Figure 1:
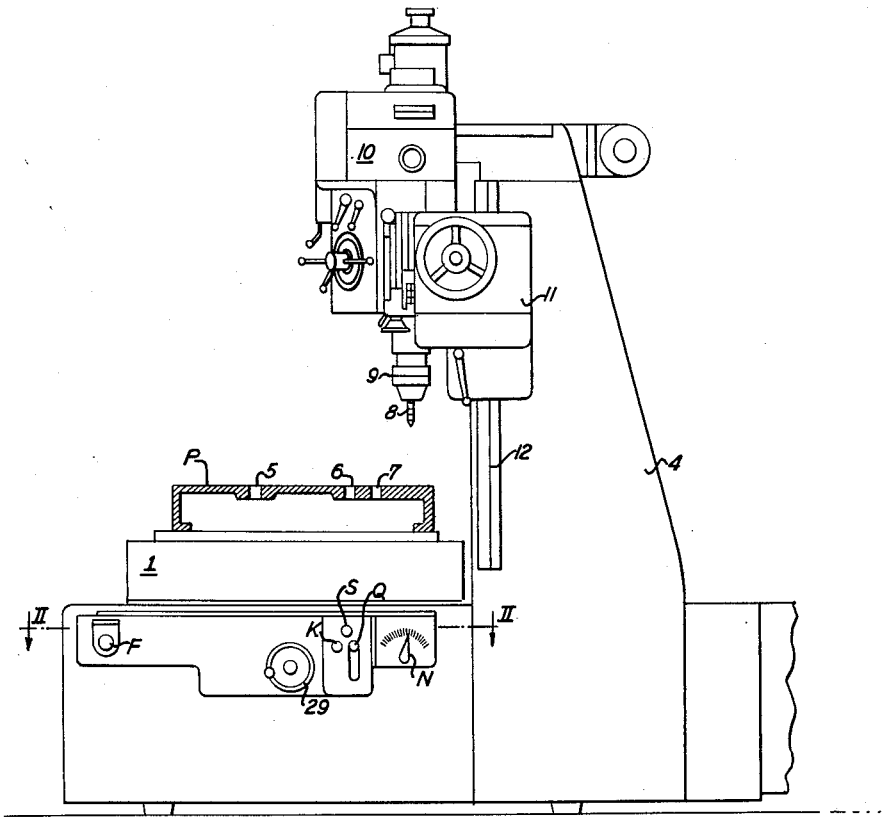
FIG. 1 is a side view of a jig boring machine provided with a system constructed in accordance with the present invention.

According to FIGS. 1 to 6 of the attached drawing, the jig boring machine illustrated comprises a table 1 sliding along slide rails 2, 3 (FIG. 5) provided on a frame 4. The table 1 carries a workpiece P (FIG. 1) into which are to be machined drillings 5, 6, 7 by means of a drill 8 fastened to the extremity of a spindle 9. Said spindle is carried by a head 10 transversely movable with respect to the table 1 along a cross bar 11 and vertically movable along lateral slide rails 12 carried by the frame 4.

The table 1 is driven by an electric motor $E_1$ (FIG. 2) controlled by a hand-operating member 28 (FIG. 1). The setting of the table 1 in exact position is carried out manually by means of a hand wheel 29 connected to a driving shaft 30 by the intermediary of a coupling 31 (FIG. 5), the two parts of which are normally kept clear one from the other by a spring 33. The driving shaft 30, connected to the shaft of the motor $E_1$ by means of a gear box V, carries a worm 34 mechanically connected to lead screw 35. Said lead screw is carried, on the one hand, by bearings provided in a protective casing 38 and, on the other hand, by a bearing 39 (FIG. 2) forming an axial stop and fastened to the frame 4. A nut 41 fastened to the table 1 and engaged onto said lead screw drives said table along its slide rails 2, 3.

The jig boring machine illustrated is also equipped with a repeater system of predetermined positions of the table 1. Said position repeater system (FIG. 6) comprises:

(1) A repeater device RA,
(2) A control device CT, and
(3) A motor drive system coupled to repeater device RA via control device CT.

For clearness of the description, each of said devices will be described successively.

The repeater device RA comprises:

(a) A first rotative memory member M to register approximate positions of the desired stop positions of the table 1. Said memory member M, driven at a constant speed by a synchronous motor MS fed by an electric network R, is constituted by a drum 36 made of a non-ferromagnetic material covered with a layer 37 of a locally magnetizable ferromagnetic material;

(b) A current impulse generator device comprising:

(1) A three-phase alternator A, the rotor of which is rigidly fastened on the same shaft 54 as the rotative memory member M while its stator, connected by conductors 46 to a phase shifter ES, feeds said phase shifter with three-phase alternating current;

(2) The phase shifter ES, constituted by a synchronous transmitter, the rotor of which, carried by a shaft 43, is connected by means of a speed reducer rv to a toothed rack 44 carried by the table 1. The reduction ratio is chosen in such a manner that when the table 1 is moved along its slide rails from the one until the other of its two end positions, the shaft 43 performs an angular displacement which is at most equal to 180°;

(3) An electronic equipment AE for conveying one form of current into another form of current is connected by conductors 48 to the phase shifter ES and which receives from said phase shifter a sinusoidal alternating current $ct$ the phase of which is a function of the positions of the table 1. Said electronic equipment emits in conductors 56 current impulses $it$ of very short duration, at each complete period of the feeding current $ct$. Said impulses $it$ are thus emitted at the frequency $f_1$ of the feeding current $ct$ and are in phase concordance with said current;

(c) Registering magnetic heads $TE_1$, $TE_2$ ... $TE_n$, the number of which is equal to the maximum number of the stop positions which the memory member M may register. Said magnetic heads are connected electrically successively to the electronic equipment AE by the intermediary of a selector SE and of a switch J. Each registering head comprises a magnetic circuit 49 carrying an excitation winding 50 and presenting an air gap 51 located in the proximity of the surface of the memory member M;

(d) Reading magnetic heads $TL_1$, $TL_2$ . . . $TL_n$, the number of which is equal to the registering heads and which are similar to said registering heads. Each reading head is located in a plane perpendicular to the revolving axis of the memory member M in which is located a registering head. At each passage of an area, magnetized by an impulse $it$ and representing the registering onto the memory member M of said impulse $it$ in front of the air gap 51 of the reading head which is in service, said head emits, in the conductors 58, a current impulse $iM$;

(e) A phase comparator CP is connected, on the one hand, by means of conductors 55 permanently to conductors 56 connected to the electronic equipment AE and, on the other hand, successively to each of the reading heads by the intermediary of conductors 58 and of a selector SL. Said phase comparator CP delivers a sinusoidal alternating current $dM$ which controls an electronic amplifier RC fed by a power supply, not represented. Said sinusoidal alternating current $dM$ presents an amplitude which is a function of the phase difference of the impulses $it$ and $iM$ feeding the phase comparator CP and which reduces to zero when the phase of the current impulses $it$ is shifted 180° with respect of the phase of the current impulses $iM$.

Said electronic amplifier RC is connected by conductors 57 to at least one relay included as shown in the control device CT for the displacements of the table 1. Said relay controls the feeding of the motor $E_1$ which drives said table 1 by the intermediary of the gear box V.

Figure 2:
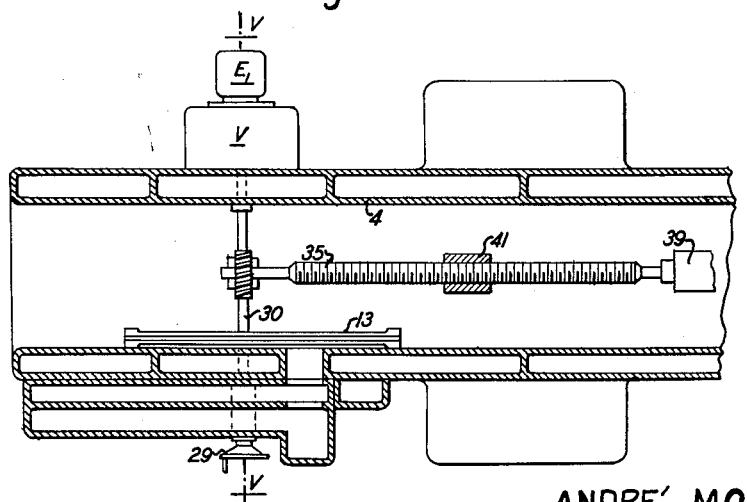
FIG. 2 is a horizontal cross section along line II—II of FIG. 1.
Figure 6:
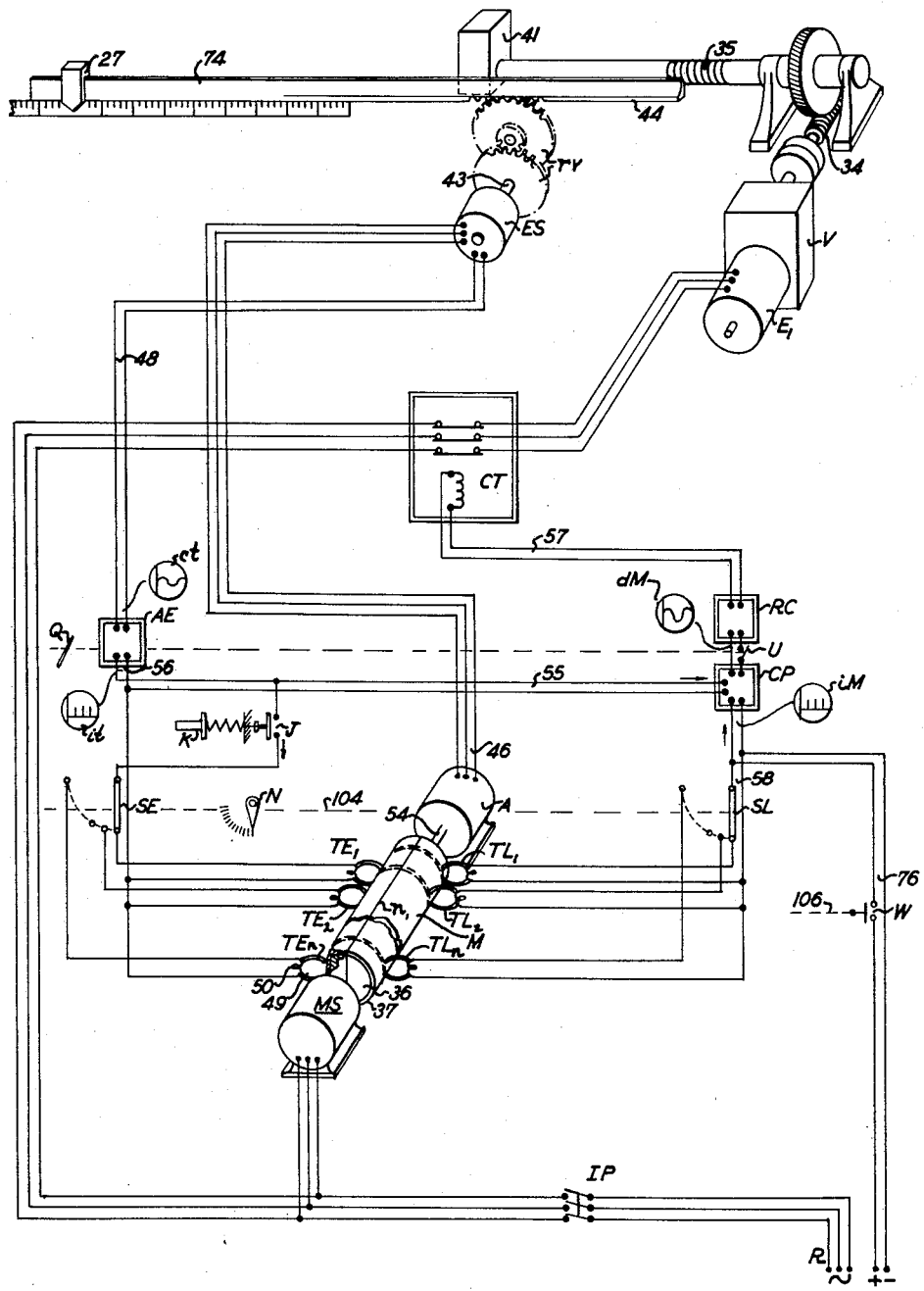
FIG. 6 is a diagram of the mechanical and electrical connections made in accordance with the present invention between different system components and jig boring machine components.
Figure 7:
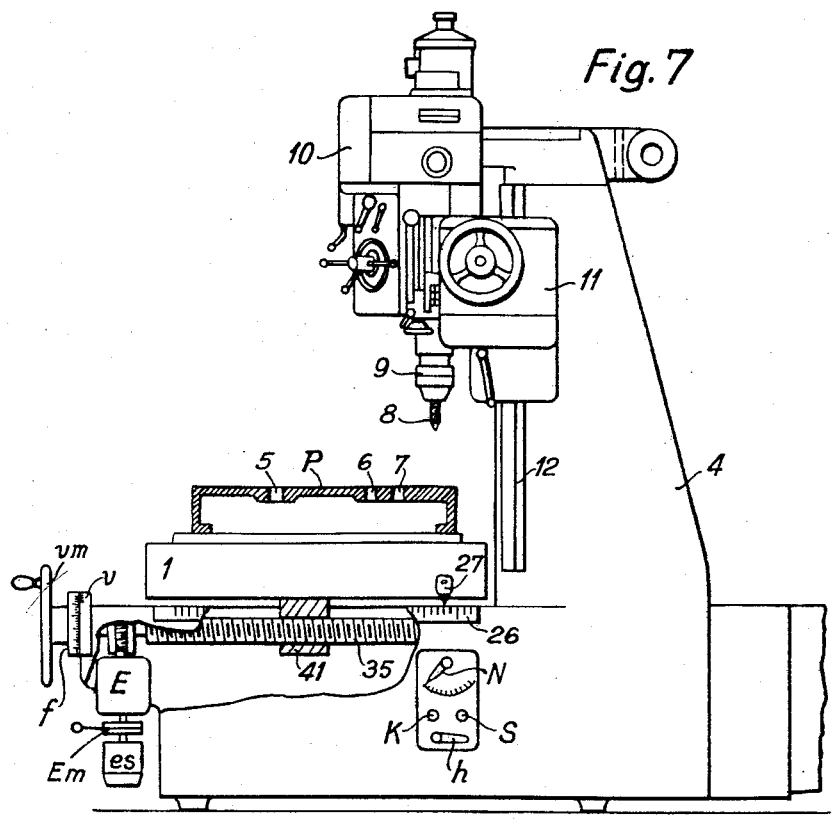
FIG. 7 is a side view with partial cross section of a machine tool equipped only with a ruler to spot roughly the position of the movable machine tool member.

The operation of the described device is the following:

A first workpiece P is rigidly fastened on the table 1, then by actuating the operating member 28 (FIG. 1) in one direction or the other, the operator causes the energization of the motor $E_1$. Said motor drives the table 1 at high speed along its slide rails by the intermediary of the gear box V and of the worm 34 which drives the lead screw 35 on which is engaged the nut 41 fastened to the table 1 (FIGS. 2, 5 and 6). During said displacement at high speed, the operator observes the auxiliary ruler 26 (FIG. 3) carried by the frame 4 in front of which moves the mark 27, said mark being carried by the table 1. He stops the table in a desired position.

This operation corresponds to the operation which is necessary for the initial setting in position of the table of a jig boring machine of known kind, and the recording of a repeat position. In order to carry out said recording, the operator proceeds in the following manner:

(1) He closes a main switch IP in order to supply voltage to the synchronous motor MS. From then on the memory member M is driven in rotation at a constant speed;

(2) He actuates the member N in order to set the selectors SE and SL (FIG. 6) in the same angular position corresponding, for instance, to the right-hand end contact. In order to facilitate said operation, these selectors are connected one to the others and to the control member N (FIG. 1) by means of a linkage or by means of an electromagnetic connection schematically illustrated in FIG. 6 through the dashes 104. Through only one operation, the operator selects the registering heads of the repeater device RA, which corresponds to that of the stop position which should be registered;

(3) He actuates control member K connected electromagnetically or by a linkage to the switch J.

The closing of the switch J causes the excitation of the winding 50 of one of the registering heads $TE_1$, $TE_2$ . . . $TE_n$, which is in service through the current impulses $it$ and therefore causes the magnetic registering onto said memory member M of said current impulses $it$.

Now the rate of these current impulses is given by the alternator A, the rotor of which is rigidly fastened on the same shaft as the memory member M, the magnetized area, created on the surface of said memory member by the passage of said impulses in the registering head, comes always on the same place of the surface of the memory member. The angular position of the generatrix of the memory member M, on which are registering said current impulses $it$ with respect to a generatrix $n_1$ taken as an origin, is a function of the angular position of the shaft 43 of the phase shifter ES, since the phase of the current $ct$, issuing from said phase shifter, is a function of the angular position of its shaft 43 which is in turn a function of the position of the table 1 along its slide rails 2 and 3. The magnetic registering of said current impulses $it$ constitutes then the remembrance of said position of the table 1.

Said first stop position of the table 1 being registered, the operator actuates from one step the control member N in order to set in service the registering head $TE_2$ for the registering of the second position.

The operator proceeds in the same way for each desired stop position of the table 1 and when all these positions are registered, said positions may be repeated by the operator in the following manner:

(1) He sets the control member N of the selectors SE, SL in the position carrying the order number of the desired stop position of the table 1, (2) He closes the main switch IP that causes the energization of the synchronous motor MS, (3) He actuates a repetition control member Q connected by a linkage or by an electromagnetic connection—schematically illustrated in FIG. 6 by the line 53—to switch U connected respectively in the electric connections connecting the phase comparator CP to the amplifier RC. The actuating of said member Q causes the establishment of said electric connections and thus the energization of the amplifier RC controlled by said phase comparator CP.

At each passage of a magnetized area of the memory member M in front of the air gap of the reading head which is in service, a current impulse $iM$ is emitted in the conductors 58. The phase comparator CP receives consequently, on the one hand, the current impulses $iM$, generated by the registering of the exact position of the micrometer corresponding to the desired stop position of the table 1 and, on the other hand, the current impulses $it$ issuing from the impulse generator A, ES, AE the phase of which corresponds at every moment to the instantaneous position of the table 1. Consequently, if the phase of the current impulses $it$ does not correspond to the phase of the current impulses $iM$, said phase comparator CP delivers a voltage $dM$ called "error voltage," the amplitude of which is a function of the phase difference between the current impulses $it$, $iM$. Said error voltage $dM$ reduces to zero when the phase of the current impulses $it$ is displaced 180° with respect to the phase of the current impulses $iM$.

The phase comparator CP receives thus the current impulses $iM$, the phase of which corresponds to the approximate desired stop position and the current impulses $it$, the phase of which corresponds, at every moment, to the position of the table 1 along its slide rails. Consequently when the operator operates the operating member 28 in the sense of the desired displacement of the table 1, the control device CT causes the energization of the motor $E_1$ and the displacement of the table 1. In proportion, as the table approaches its stop position, the phase difference between the impulses $it$ and $iM$ decreases and when said difference reaches a predetermined fixed value corresponding to the instantaneous position of the table and the desired position for said table, the control device CT controlled by the amplifier RC causes the breaking of the circuit of the motor $E_1$.

When a workpiece comprising a certain number of machining operations which have been already machined by the machine and the positions of said machining operations have been registered into the memory device, two cases may exist:

(1) An unmachined workpiece is fastened on the machine and said machine repeats the machining operations into the positions registered by the memory device.

(2) A workpiece on which some machining operations have already been carried out in well-determined positions is fastened on the machine and the memory device must move the workpiece under the tool over distances which must be not only exact between the positions given by the memory device but also with respect to the positions previously machined.

One proceeds then as follows:

Knowing the position of a reference machining on the workpiece, the table is brought into said position and the workpiece is moved with respect to the table on which said workpiece is to be fastened until a centering tool, taking the place of the working tool, shows that the reference machining is in the exact position which said machining would have had if it had been machined on the machine. That is what is called the centering of a workpiece. Said workpiece being generally very heavy and difficult to move, it is difficult to set said workpiece with respect to the table with the same exactness that it is possible to move the members of the machine fitted with adequate sliding devices, adjusting devices and locking devices.

It is therefore easier to make only a rough centering of the workpiece with respect to the working table on which said workpiece is set and to move the measuring members and the memory members in order to realize again the desired exact correspondences between the already machined surfaces and the surfaces which remain to machine.

In order to carry out said centering, the operator, after having fastened a new workpiece on the table, carries out the following operations:

(1) He repeats the position of the reference machining which also has been registered into the memory device during the machining of the first workpiece, (2) He moves manually the table 1 until the reference machining comes into the correct position, (3) By the help of an adjusting member 32, he moves then the toothed rack 44 in the opposite direction. To this effect, said toothed rack 44 is mounted on slides 74. By said operation, the operator brings back the shaft 43 of the phase shifter ES into the position which it occupied previously after the repetition of the reference position.

From then on the workpiece P is in its correct position with reference to the memory member M as well as with respect to the measuring members of the machine, so that the operator may proceed with the machining of said workpiece.

When the operator has finished the machining of a series of identical workpieces, he erases the magnetic areas representing the registerings on the memory member M of the different stop positions of the table 1. In order to erase said magnetic areas, he closes the main switch IP and actuates a control member 106, connected to switch W inserted in conductors 76 connecting the reading heads $TL_1$ $TL_2$ ... $TL_n$ to a source of direct current. The direct current flowing through the excitation winding 50 is of a sufficient value to magnetize each registering track in the sense opposite to the magnetization of the magnetized areas representing the registerings of the current impulses $it$. Each track of the memory member M is then magnetized in a homogeneous manner over its whole length and may no more induce current impulses into the reading heads.

From the foregoing detailed description, it should be apparent that the invention provides a control device for governing repeating positions of a movable member, such as table 1, of a machine tool. The system includes a memory device including at least one magnetic memory member M, alternator means A coupled to and driven in synchronism with the memory member M for generating a sinusoidal alternating current, and means ES connected to the movable member, table 1, and to the alternator A for generating a sinusoidal current having a phase angle that is a function of the position of the movable member or table 1. The system further includes means AE for converting the sinusoidal current leaving ES into a pulsating wave form current, magnetic head means ($TE_1$–$TE_n$ and $TL_1$–$TL_n$) located opposite the surface of the memory member M, and phase comparator means CP connected to the current converting means AE. Switching means SE and SL are provided for alternately connecting the magnetic head means to the current converting means AE to record on the member M the pulses emitted by the current converting means AE, and to the phase comparator means CP for supplying to said phase comparator means pulses recorded on the memory member M. The phase comparator means comprises means for delivering an error voltage, the value of which is a function of the phase difference between the pulses supplied thereto by the current converting means AE and the pulses which are received from the memory member M by the intermediary of the magnetic means which, as suggested above, comprise a first series of magnetic heads $TE_1$–$TE_n$ and a second series of magnetic heads $TL_1$–$TL_n$. Control means, RC and CT, are connected to the phase comparator means CP and responsive to the error voltage, and a driving device $E_1$ is operatively connected to the movable member or table 1 and to the control means for control thereby.

Reference has been made hereinabove to "impulses" or "pulses" of current. It is to be understood that the term "pulse" as used in this specification, and the appended claims, refers to an electrical wave form having a duration which constitutes a fractional part of a cycle of operation. Thus, a pulse, as used herein, is to be distinguished from a sinusoidal wave form.

While the basic system provided by the invention has been described in some detail hereinabove, it should be noted that this system is readily adapted for use with optical positioning means of the type which provide for extreme accuracy. More specifically, the system of the invention claimed in this application represents a substantial improvement over the prior art in that it utilizes, and provides for the utilization of, pulses representative of the instantaneous position of the movable member of a machine tool. Moreover, such system can be readily used in combination with an optical system whereby the system presented herein serves as a "coarse adjustment" which moves the table of the machine tool to a preset position within a certain distance from an exact position and then turns over control to the optical means which serves to advance the table to the exact position.

After reading the foregoing detailed description of the illustrative and preferred embodiment of the present invention presented in the annexed drawings, it will be apparent that the objects set forth at the outset of this specification have been successfully achieved. Various modifications can be made to the basic system without departing from the scope and spirit of the invention, as will be understood by those skilled in the art. Accordingly, we claim:

1. In a control device for governing repeating positions of a movable member of a machine tool, the combination of a memory device comprising at least one rotative magnetic memory member, alternator means coupled to and driven in synchronization with said memory member for generating a sinusoidal alternating current, means connected to said movable member and to said alternator means for generating a sinusoidal current having a phase angle that is a function of the position of the movable member, means for converting said sinusoidal current into a pulsating waveform current, magnetic head means located opposite the surface of said memory member; phase comparator means connected to said current converting means; switching means for alternatively connecting said magnetic head means to said current converting means to record on said memory member said pulses emitted by said current converting means, and to said phase comparator means for supplying to said phase comparator means pulses recorded on said memory member; said phase comparator means comprising means for delivering error voltage, the value of which is a function of the phase difference between the pulses supplied thereto by the current converting means and the pulses which are received from the memory member by the intermediary of said magnetic head means; control means connected to said phase comparator means and responsive to said error voltage; and a driving device operatively connected to said movable member and to said control means for control thereby.

2. A repeater device as defined in claim 1, wherein said magnetic head means comprises a first series of magnetic heads adapted to be selectively coupled to said current converting means, and a second series of magnetic heads adapted to be selectively coupled to said phase comparator means.

References Cited in the file of this patent

UNITED STATES PATENTS

| | | |
|---|---|---|
| 2,475,245 | Leaver | July 5, 1949 |
| 2,537,770 | Livingston | Jan. 9, 1951 |
| 2,561,346 | De Vlieg et al. | July 24, 1951 |
| 2,722,853 | Knosp et al. | Nov. 8, 1955 |
| 2,736,852 | Nelson | Feb. 28, 1956 |
| 2,848,921 | Koulikovitch | Aug. 26, 1958 |
| 2,852,976 | Hoffmann | Sept. 23, 1958 |